US007313319B2

(12) United States Patent
Miyauchi

(10) Patent No.: US 7,313,319 B2
(45) Date of Patent: Dec. 25, 2007

(54) INFORMATION STORAGE MEDIUM, VIDEO RECORDING METHOD AND INFORMATION REPRODUCING DEVICE

(75) Inventor: Fumito Miyauchi, Shibuya-ku (JP)

(73) Assignee: Konami Corporation, Tokyo (JP)

( * ) Notice: Subject to any disclaimer, the term of this patent is extended or adjusted under 35 U.S.C. 154(b) by 1326 days.

(21) Appl. No.: 09/963,186

(22) Filed: Sep. 25, 2001

(65) Prior Publication Data

US 2002/0085833 A1 Jul. 4, 2002

(30) Foreign Application Priority Data

Dec. 28, 2000 (JP) ............................ 2000-402539

(51) Int. Cl.
*H04N 5/917* (2006.01)

(52) U.S. Cl. .......................... 386/111; 386/112; 386/95

(58) Field of Classification Search .................. 386/33, 386/45, 55, 109, 111, 112, 125, 126, 106, 386/95, 12; 434/307 A; 369/30.18, 275.3, 369/30.04

See application file for complete search history.

(56) References Cited

U.S. PATENT DOCUMENTS 5,798,995 A 8/1998 Fukushima et al.
5,863,206 A * 1/1999 Narusawa et al. ............ 386/55
6,034,942 A * 3/2000 Yoshio et al. ............... 386/126
6,141,491 A * 10/2000 Yamagishi et al. ......... 386/109
6,556,775 B1 * 4/2003 Shimada ..................... 386/121
6,582,235 B1 * 6/2003 Tsai et al. ............... 434/307 A

* cited by examiner

*Primary Examiner*—John Miller
*Assistant Examiner*—Christopher Onuaku
(74) *Attorney, Agent, or Firm*—Jordan and Hamburg LLP

(57) ABSTRACT

The video data including the unit compressed video data, each reproducible independently of each other, are recorded on the video data recording areas as the divided video data. The divided video data includes one or more integer number of unit compressed video data, which total data amount is not more than a predetermined data amount. The divided video data is recorded in the video data recording areas such that the head thereof coincides with the head of the sector on the information storage medium. Therefore, at the time of reproduction, by reading out one divided video data, the unit compressed video data can be obtained from the head of the divided video data thus read out. Thus, video data may be quickly reproduced by a simple processing even at the time of the special reproduction.

18 Claims, 4 Drawing Sheets

INFORMATION STORAGE MEDIUM, VIDEO RECORDING METHOD AND INFORMATION REPRODUCING DEVICE

BACKGROUND OF THE INVENTION

1. Field of the Invention

This invention relates to a computer game system utilizing video and music, and more particularly to a technique of recording and reproducing video and music in the computer game system.

2. Description of Related Art

There are known various games incorporating essence of music. In one of such games, a game player (user) operates an input device in conformity with music reproduced by the game system and/or marks shown on a display monitor of the game. In a game of another type, the game players are given a guidance of how to dance and compete with each other by their scores indicating how well they danced. Recently, compressive encoding technique of video data, such as MPEG2 system, is applied to such music game systems in order to enhance the quality of game picture.

The compressive encoding technique such as MPEG2 system compresses video data utilizing correlation of successive pictures in the time axis, and hence it is necessary to decode the video data by every predetermined unit to reproduce the video data. Specifically, in the case of MPEG2, the video data is decoded and reproduced by the data unit called GOP (Group Of Picture).

On the other hand, the video data constituted by a group of GOPs is recorded on a storage medium by the unit of the sector formed on the storage medium, and hence the video data including a plurality of successive GOPs according to the MPEG2 system is recorded on a plurality of sectors. At this time, the GOPs are not positioned correspondingly with the positions of the sectors.

At the time of reproduction, the video data recorded on the successive sectors are temporarily stored into the buffer memory, and the GOPs are identified and extracted from the video data of the plural sectors. Then, the video data is supplied from the buffer memory to the decoder by the unit of GOP, and then the decoding processing is performed.

However, in such a music game, the game player not only simply reproduces the tune from its start to its end, but also controls the reproduction of the tune by changing the reproduction position to the intermediate portion of the tune or another tune, or by repeatedly reproducing the same portion of the tune, thereby to enjoy playing the game. In such a case, the read-out position of the video data is changed according to the change of the reproduction position. However, as mentioned above, the video data can be reproduced only by the GOP unit and the head of the sector does not necessarily coincide with the head of the GOP. Therefore, every time when the reproduction position is changed, the video data of several sectors around the reproduction position after the change is stored into the buffer memory and the GOP unit is identified to decode the video data. This process is quite complicated, and requires a buffer memory of large storage capacity. In addition, since this process lowers the processing speed, it is inappropriate that the game system executes this process on the real-time basis during the game play.

SUMMARY OF THE INVENTION

It is an object of the present invention to provide an information storage medium, a video recording method and an information reproducing device, adapted to be used for a music game system, capable of quickly reproducing video data by a simple processing even at the time of the special reproduction.

According to one aspect of the present invention, there is provided an information storage medium for recording video data including a plurality of unit compressed video data successive on a time axis and each of which is reproducible independently of each other, the medium including: a plurality of video data recording areas, each of the plurality of video data recording areas recording divided video data including one or more integer number of unit compressed video data successive on the time axis, a total data amount of the unit compressed video data being not more than a predetermined data amount, wherein the divided video data is recorded in each of the plurality of video data recording area such that a head of the divided video data coincides with a head of a sector on the information storage medium.

In accordance with the information storage medium thus configured, the video data including the unit compressed video data, each reproducible independently of each other, are recorded on the video data recording areas as the divided video data. The divided video data includes one or more integer number of unit compressed video data, which total data amount is not more than a predetermined data amount. The divided video data is recorded in the video data recording areas such that the head thereof coincides with the head of the sector on the information storage medium. Therefore, at the time of reproduction, by reading out one divided video data, the unit compressed video data can be obtained from the head of the divided video data thus read out, and this eliminates the processing for operating the recorded information on the plurality of sectors to identify and produce the unit compressed video data.

Preferably, the information storage medium may further include a table recording area for recording a table indicating correspondence between time information of the divided video data and positional information of the sectors on which the unit compressed video data is recorded. By this, when the video data to be reproduced is designated in a manner associated with the time information of the video data, the sector on which the corresponding video data is recorded may be readily determined.

In an example, the predetermined data amount may be a storage capacity of a reproduction device which reproduces the video data recorded on the storage medium. By this, the recording area of the information storage medium may be efficiently used to record video data.

According to another aspect of the present invention, there is provided a method of recording video data on an information storage medium, the video data including a plurality of unit compressed video data successive on a time axis and each of which is reproducible independently of each other, the method including the steps of: a step of receiving the video data and dividing the received video data into a plurality of unit compressed video data; a step of combining one or more integer number of unit compressed video data successive on a time axis to produce divided video data such that a total data amount of the unit compressed video data is not more than a predetermined data amount; and a step of recording each of the divided video data on the information storage medium such that a head of the divided video data coincides with a head of a sector on the information storage medium.

In accordance with the information storage medium thus configured, the video data is divided into unit compressed video data each reproducible independently of each other, and the divided video data is produced from one or more integer number of unit compressed video data such that the total data amount of the unit compressed video data is not more than a predetermined data amount. The divided video data is recorded in the video data recording areas such that the head thereof coincides with the head of the sector on the information storage medium. Therefore, at the time of reproduction, by reading out one divided video data, the unit compressed video data can be obtained from the head of the divided video data thus read out, and this eliminates the processing for operating the recorded information on the plurality of sectors to identify and produce the unit compressed video data.

According to still another aspect of the present invention, there is provided an information reproducing device for reproducing video data from an information storage medium on which the video data, including a plurality of unit compressed video data successive on a time axis and each of which is reproducible independently of each other, is recorded as a plurality of divided video data each configured by a combination of the unit compressed video data such that that a head of the divided video data coincides with a head of a sector on the information storage medium, the device including: a buffer memory; a storing unit for reading out the video data from the information storage medium by the unit of the divided video data and storing the video data into the buffer memory; and a video reproducing unit for decoding the unit compressed video data included in the divided video data stored in the buffer memory to reproduce the video data.

According to the information reproducing device thus configured, the video data is read out from the information storage medium and stored into the buffer memory by the unit of the divided video data. Then, the video data is decoded by the unit of the unit compressed video data in the buffer memory, and is reproduced. At this time, the head of the divided video data stored into the buffer memory coincides with the head of the sector, and hence the decoding and reproduction of the video data may be immediately performed.

Preferably, the information reproducing device may further carry a table indicating correspondence between time information of the divided video data and position information of a sector on which the unit compressed video data is recorded. The information reproducing device may further include: a receiving unit for receiving a designated reproduction position; and a determining unit for determining sector position corresponding to the designated reproduction position. The storing unit may store the unit compressed video data from the designated sector position into the buffer memory. Thus, by referring to the table, the position of the sector corresponding to the designated reproduction position can be obtained, and the video data is reproduced from the position.

Preferably, the information storage medium may further carry music data independent of the video data, and the divided video data may include time information of the divided video data. The information reproducing device may further include: a music reproducing unit for obtaining music data corresponding to the designated reproduction position from the information storage medium and for reproducing the music data; and a synchronization control unit for controlling synchronization of the reproduction of the music data by the music reproducing unit and the reproduction of the video data by the video reproducing unit by comparing reproduction position information currently reproduced by the music reproducing unit with the time information in the divided video data. Thus, the synchronized reproduction of the music data and the video data can be achieved based on the time control information recorded in each sector.

In an embodiment, the information reproducing device may further include: a unit for receiving a reproduction position change instruction inputted by a game player; a unit for determining a changed music reproduction position corresponding to the reproduction position after the change based on the change instruction; a unit for determining a changed video reproduction position corresponding to the changed music reproduction position by referring to the table; and a unit for controlling the music reproduction unit to reproduce the music data from the changed music reproduction position and controls the video reproduction unit to reproduce the video data from the changed video reproduction position. Therefore, the game player can arbitrarily change the reproduction position.

The nature, utility, and further features of this invention will be more clearly apparent from the following detailed description with respect to preferred embodiment of the invention when read in conjunction with the accompanying drawings briefly described below.

DETAILED DESCRIPTION OF THE PREFERRED EMBODIMENTS

The preferred embodiment of the present invention will now be described below with reference to the attached drawings.

Figure 1:
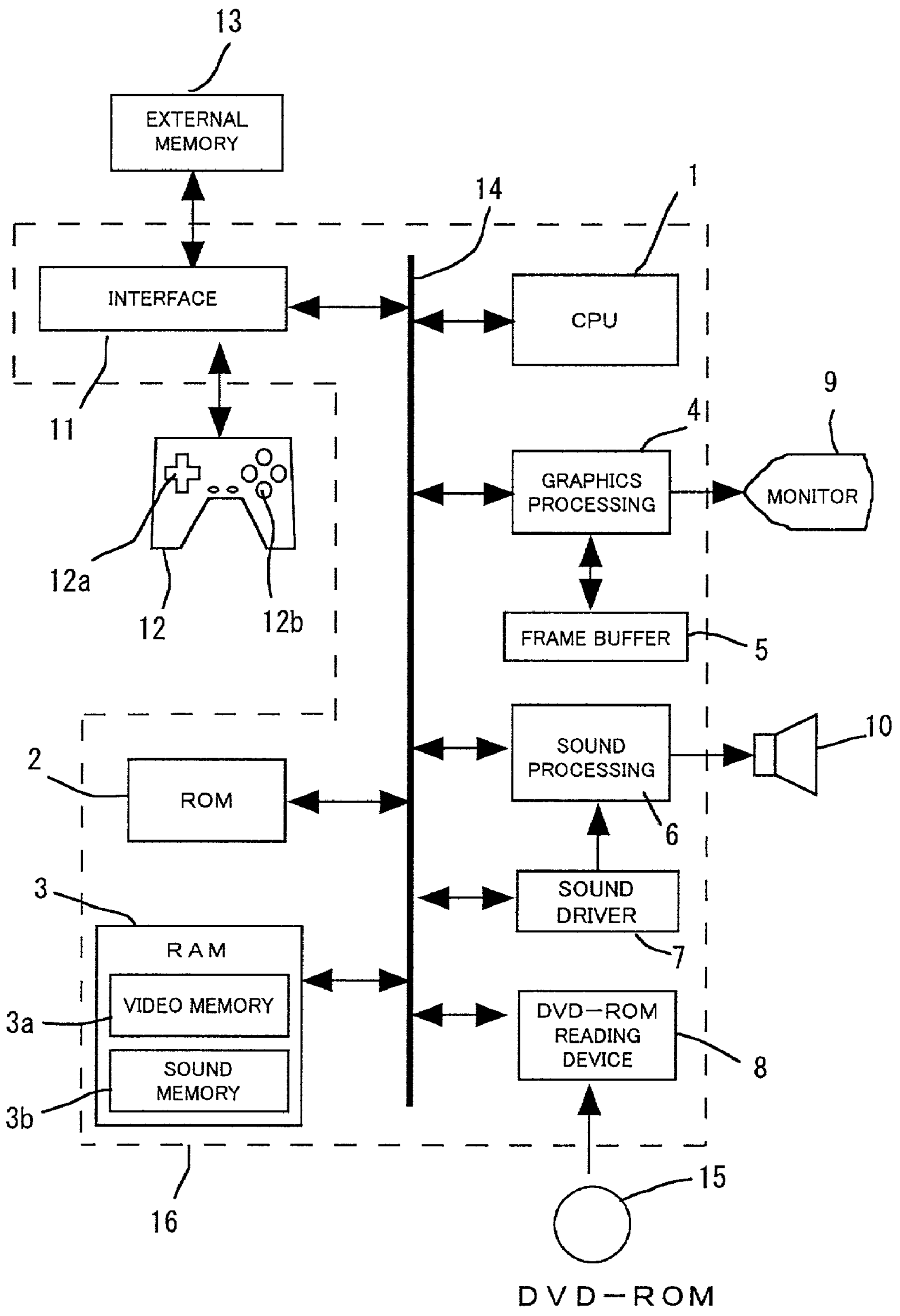
FIG. 1 is a block diagram showing the schematic configuration of a game system according to the present invention.

An embodiment to which the present invention is applied to a home-use game system will be described below with reference to FIGS. 1 to 4. FIG. 1 shows a configuration of a home-use game system. The home-use game system executes game programs recorded on a DVD-ROM 15 described later to operate as a music game system.

This game system includes a CPU (Central Processing Unit) 1 mainly constituted by a microprocessor, a ROM 2 and a RAM 3 serving as main storage devices for the CPU 1, a Graphics Processing Unit (GPU) 4 for executing predetermined processing associated with picture drawing and/or sound reproduction based on the instruction by the CPU 1, a sound driver 7, a sound processing unit (SPU) 6, a frame buffer 5 which functions as a temporary storage unit for the GPU 4, and a DVD-ROM reading device 8. In the ROM 2, an operation system which is a program necessary for the overall control of the game system is stored. In the RAM 3, the program and/or data of the game read-out from the DVD-ROM 15 serving as a storage medium are written as needed. The CPU 1 creates the video memory 3*a* and the sound memory 3*b* within the RAN 3 according to the program stored in the ROM 2. These memories 3*a* and 3*b* are used as buffers used for the video processing and sound processing before the data are supplied to the GPU 4 and the sound driver 7. It is noted that a plurality of buffer memories each having a predetermined data capacity are formed in the video memory 3*a*.

The GPU 4 receives data necessary for displaying picture from the CPU 1 to produce game picture data of one frame on the frame buffer 5, converts the picture data thus produced into a video reproduction signal and supplies it to the monitor 9 at appropriate timings.

The sound driver 7 reads out music data (e.g., ADPCM voice and music data) from the DVD-ROM 15 and temporarily stores them in the sound memory 3*b*, and outputs them to the sound processing unit 6. The music data stored in the DVD-ROM 15 is separated into a plurality of blocks each having a predetermined data length, and the sound driver 7 divides the music data into a plurality of blocks and supplies them to the sound processing unit 6. The sound processing unit 6 decodes the music data supplied from the sound driver 7, converts them into the analog signal and outputs it as a sound from the speaker 10.

The DVD-ROM reading device 8 reads out the program and/or data recorded on the DVD-ROM 15 in response to the instruction from the CPU 1, and outputs the signal corresponding to the read-out contents. Generally, the monitor 9 may be a home-use television receiver, and the speaker 10 may be a built-in speaker of the television receiver.

The CPU 1 is connected with an interface 11 via the bus 14, and the controller 12 and the external memory 13 are detachably connected to the interface 11. The controller 12 functions as a general-use input device of the game system, and is equipped with operation members to be manipulated by the user. The operation members include a direction instruction switch 12*a* for the selection of the direction, and a plurality of push-button switches 12*b*. The interface 11 scans the operational status of the operation members on the controller 12 with a predetermined interval (e.g., 1/60 sec.), and outputs a signal corresponding to the scan result to the CPU 1. The CPU 1 judges the operational status of the controller 12 based on the signal. Preferably, the external memory 13 may be a semiconductor memory such as a flash ROM, however, other various storage devices such as a magnetic storage device or a magneto-optical storage device may be used as the external memory 13. A plurality of input devices such as the controllers 12 may be connected to the interface 11 at the same time.

With the above configuration, the elements other than the monitor 9, the speaker 10, the controller 12, the DVD-ROM 15 and the external memory 13 are integrally accommodated in a housing to constitute a game machine body 16. The game machine body 16 may serve as a computer game system.

The DVD-ROM 15 carries program necessary for the game system to execute music game, and various data used during the execution of the program. In a music game such as a dance game, music is reproduced and predetermined pictures are displayed on the monitor 9 of the game system in synchronization with the music. These pictures teach or advise the game player the manipulation timings of the various controllers. For example, in a music game system in which the game player imaginarily plays music instruments in conformity with the reproduced music, the operation timings of the plural buttons 12*a* and 12*b* provided on the controller 12 are shown on the monitor 9 of the game system. In a dance game, guidance of how to dance is shown on the monitor 9 of the game system. With listening to the reproduced music and seeing the monitor 9 of the game system, the game player operates the controller 12 or dances on a dance stage type input device constructed with some sensors thereby to enjoy the game. Therefore, the DVD-ROM 15 stores music data and video data in addition to the game programs. In the game according to this embodiment, music data and video data are recorded on the DVD-ROM 15 separately from each other, and they are synchronized with each other by necessary processing at the time of reproduction.

Next, recording and reproduction of video data onto and from the DVD-ROM 15 will be described below. Now, assuming that music data and video data are prepared by the unit of tune and a unit of the video data corresponding to a tune is called as an "entire movie", the entire movie is divided into a plurality of "divided movies" each of which has a data capacity not more than the storage capacity of the buffer memory in the reproduction device, and the video data are recorded on sectors of the DVD-ROM 15 by the unit of the divided movie.

Figure 2A:
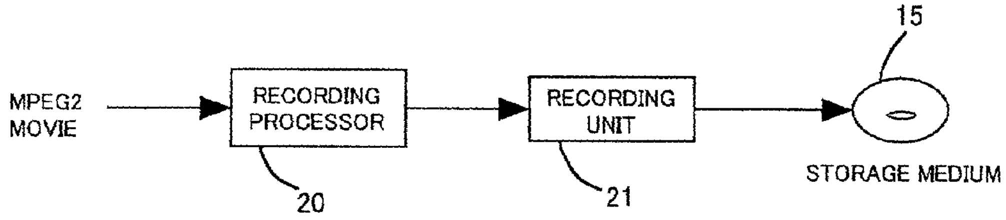
FIG. 2A is a block diagram showing the schematic configuration of a recording device which records video data onto a storage medium.
Figure 2B:
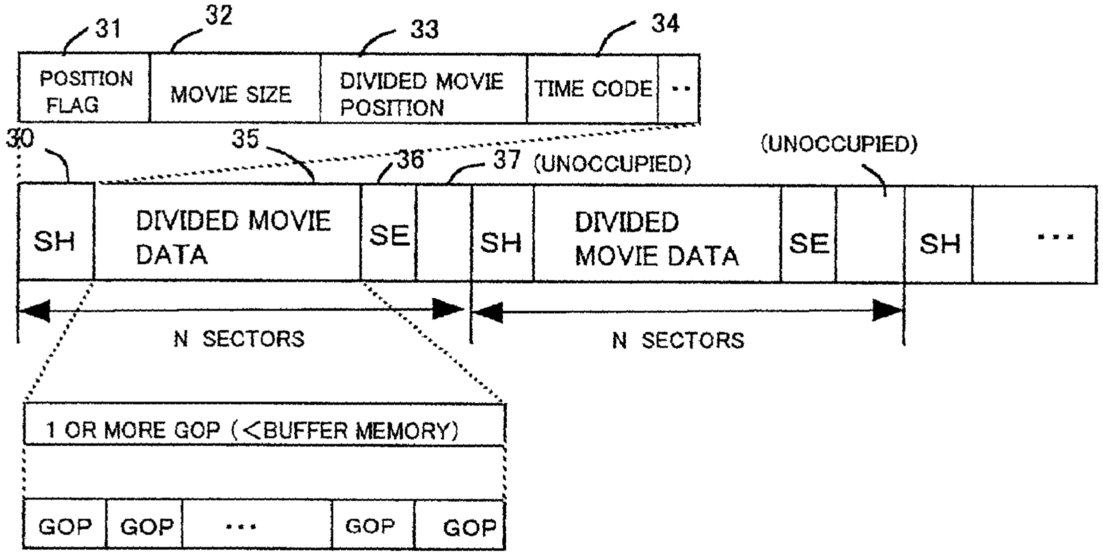
FIG. 2B is a diagram showing structure of data recorded on the storage medium.

FIG. 2B shows the structure of the video data recorded on the DVD-ROM 15 according to the present invention. The video data of an entire movie corresponding to a tune is divided into a plurality of divided movie data 35 and recorded. Each of the divided movie data 35 includes a header (SH) 30 at its head and an end code (SE) 36 at its end. One divided movie data 35 includes one or more GOPs. While the head of the header 30 at the head of the divided movie data 35 necessarily coincides with the head of the sector, one GOP may bridge plural sectors in the middle of the divided movie data 35. The header 30 may be provided in the GOP in the divided movie data 35, and the header 30 is provided at least at the head of the divided movie data 35 in the present invention. With the aid of the header 30, the video data may be retrieved and reproduced by the unit of the divided movie data 35. The end code 36 is provided at the end of the divided movie data 35, and the divided movie data 35 has a data structure of one independent movie according to MPEG2 system. Therefore, the video data may be exchanged by the unit of the divided movie data 35, and may be previewed independently of each other by the unit of the divided movie data 35.

The divided movie data 35 includes as many GOPs as possible within the storage capacity of the buffer memory (formed in the video memory 3*a* in FIG. 1) in the reproduction device. However, in order to coincide the head of the subsequent divided movie data 35 with the head of the GOP, the number of the GOPs included in the divided movie data 35 is determined to be a positive integer. The total data amount of the integer number of GOPs is not necessarily equal to the multiple of the sector storage capacity, and hence the unoccupied area 37 in which no data is recorded may be present after the end code 36 as shown in FIG. 2B.

The header 30 includes various information, i.e., the position flag 31, the movie size 32, the divided movie position information 33 and the time code 34. The position flag 31 indicates whether the divided movie data 35 is at the head of the entire movie, or in the middle of the entire movie, or at the end of the entire movie. The movie size 32 indicates the data capacity of the divided movie data 35. The divided movie position information 33 indicates the position of the divided movie 35 within the entire movie. The divided movie position information 33 may indicate the number of the divided movie data 35 counted from the head of the entire movie, for example. The time code 34 indicates the time of the divided movie data 35 counted from the head of the entire movie.

As described above, in the present invention, the video data is recorded such that the head of the divided movie data 35 necessarily coincides with the head of the sector. Therefore, by reading out and storing the video data into the buffer memory by the unit of the divided movie data 35, the buffer memory always stores the integer number of GOPs from its head portion. Thus, the image data may be immediately decoded and reproduced by the unit of the GOP.

The divided movie data 35 is a unit of the video data reproducible by the special reproduction such as the random reproduction and the jump reproduction. In the special reproduction, the GPU 4 receives the instruction given from the CPU 1 and detects the header 30 of the divided movie data 35 corresponding to the contents of the instruction. Thus, the divided movie data 35 thus detected is written into the buffer memory. At that time, by reading the divided movie data 35 from the buffer memory, the video data including an integer number of GOPs recorded from the head of the divided movie data 35 may be obtained. This can eliminate the complicated processing for writing the image data of a plurality of sectors into the buffer memory and identifying the image data by the GOP unit.

Figure 3:
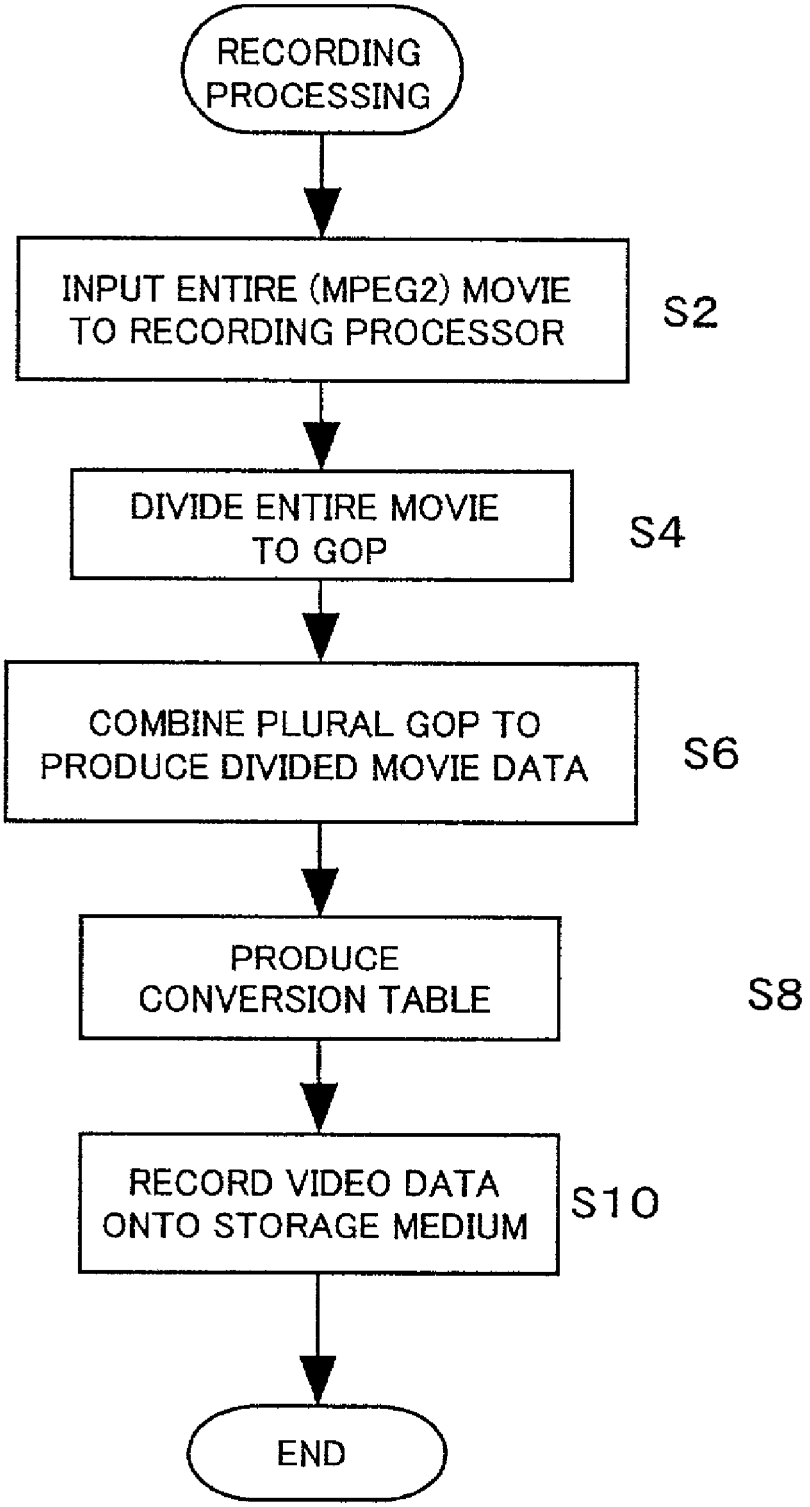
FIG. 3 is a flowchart showing video data recording processing.

FIG. 2A schematically shows the configuration of a device which performs the above described recording, and FIG. 3 shows the flowchart of the recording processing. By referring to FIGS. 2A and 3, at first, the MPEG2 movie (entire movie) to be recorded is inputted to the recording processor 20 (step S2). The recording processor 20 divides the entire movie thus received by the GOP unit (step S4). Then, the recording processor 20 combines a plurality of GOPs timely in series so that the total data amount of them is not more than the storage capacity of the buffer memory for the image reproduction provided in the game system (the video memory 3*a* in this embodiment), and adds the end code 36 to the end of the combined GOPs thereby to produce the divided movie data 35 (step S6).

Next, the recording processor 20 produces a conversion table for the conversion of the divided movie position information to the sector position (step S8). The conversion table from the divided movie position information to the sector position indicates the sector on the storage medium at which each divided movie is recorded, and is produced from the sector numbers of the sectors on which the divided movie data 35 is to be recorded and the order of the divided movie data within the entire movie.

Next, the recording processor 20 supplies the divided movie data 35 and the conversion table to the recording unit 21. As shown in FIG. 2B, the recording unit 21 records the divided movie data 35 including the headers 30 onto the storage medium (DVD-ROM) 15. In addition, the recording unit 21 records the conversion table onto the control information recording area on the DVD-ROM 15. Thus, the image recording process is completed.

At the time of reproduction, the CPU 1 reads the video data into the buffer memory by the unit of the divided movie data, and reproduces the video data. A plurality of buffer memories are formed in the video memory 3*a*, and when one divided movie data 35 is written into the first buffer memory, the head of the header 30 necessarily coincides with the head of the buffer memory, and an integer number of GOPs are always present in the buffer memory. During the reproduction of one divided movie data 35 from one buffer memory, subsequent divided movie data 35 is written into another buffer memory. Thus, the video data may be continuously reproduced.

When a certain reproduction position (e.g., frame position) is designated, the CPU 1 determines the number of the divided movie data corresponding to the designated frame position, obtains the sector position corresponding to the designated frame position by referring to thc conversion table of the divided movie position to the sector position, and reproduces the image data from the sector position thus obtained. This enables random access to an arbitrary position. It is noted that the conversion table from the divided movie position to the sector position is loaded into the RAM 3 when the DVD-ROM 15 is set in the game system, and the CPU 1 refers to the conversion table stored in the RAM 3 at the time or reproduction. It is understood that the invention includes the table indicating correspondence between time information of the divided video data and positional information of the sectors on which the unit compressed video data is recorded.

Next, the synchronized reproduction of the recorded music data and the video data will be described. In a music game, it is necessary to reproduce the music data and the video data in a synchronized manner. The game system of the present invention basically synchronizes the video data with the music data. As described above, the music data is recorded on the DVD-ROM 15 in a manner divided into a plurality of blocks after being coded by a high efficiency encoding system such as ADPCM (Adaptive Differential Pulse Code Modulation). The sound driver 7 shown in FIG. 1 reads out the music data by the block unit, temporarily stores them into the sound memory 3*b*, and then supplies them to the sound processing unit 6. The sound processing unit 6 applies the decoding processing and reproduction processing onto the received music data and supplies the resultant data to the speaker 10. The sound driver 7 constantly maintains the reproduction block information indicating the number of the block, counted from the head of the tune, which is currently being reproduced, with supplying the music data to the sound processing unit 6 by the block unit. In addition, the sound processing unit 6 constantly maintains in-block reproduction position information indicating the position of the music data, within the current block being currently reproduced, received from the sound driver 7. Therefore, when the sound driver 7 supplies the reproduction block information to the CPU 1 and the sound processing unit 6 supplies the in-block reproduction position information to the CPU 1, the CPU 1 always recognizes the reproduction position of the music data within the current tune. These reproduction position information may be of various form such as time-code, frame number or else.

On the other hand, for the video data, the divided movie position information 33 in the data structure shown in FIG. 2B indicates the position from the head of the MPEG2 movie (the entire movie). The CPU 1 compares the divided movie position information 33 with the above-mentioned reproduction position information of the music data to read out the corresponding video data from the storage medium 15 in synchronism with the reproduction of the music data and reproduces the video data. Namely, in the case of reproducing the music from the head of the tune, the music data reproduction is started from the head of the music data by the tune unit while the video data reproduction is stated from the head of the entire movie. Thereafter, as described above, the CPU 1 compares the reproduction position information in the music data with the divided movie position information 33 within the header portion of the video data to synchronize the music data and the video data with each other. In a music game, the change of music reproduction speed is sometimes requested during the game play. According to the above synchronized reproduction method, even if the speed is changed, the synchronized reproduction is performed with changing the reproduction position of the video data in correspondence with the change of the music data reproduction position. Thus, variable speed reproduction may be achieved.

Figure 4:
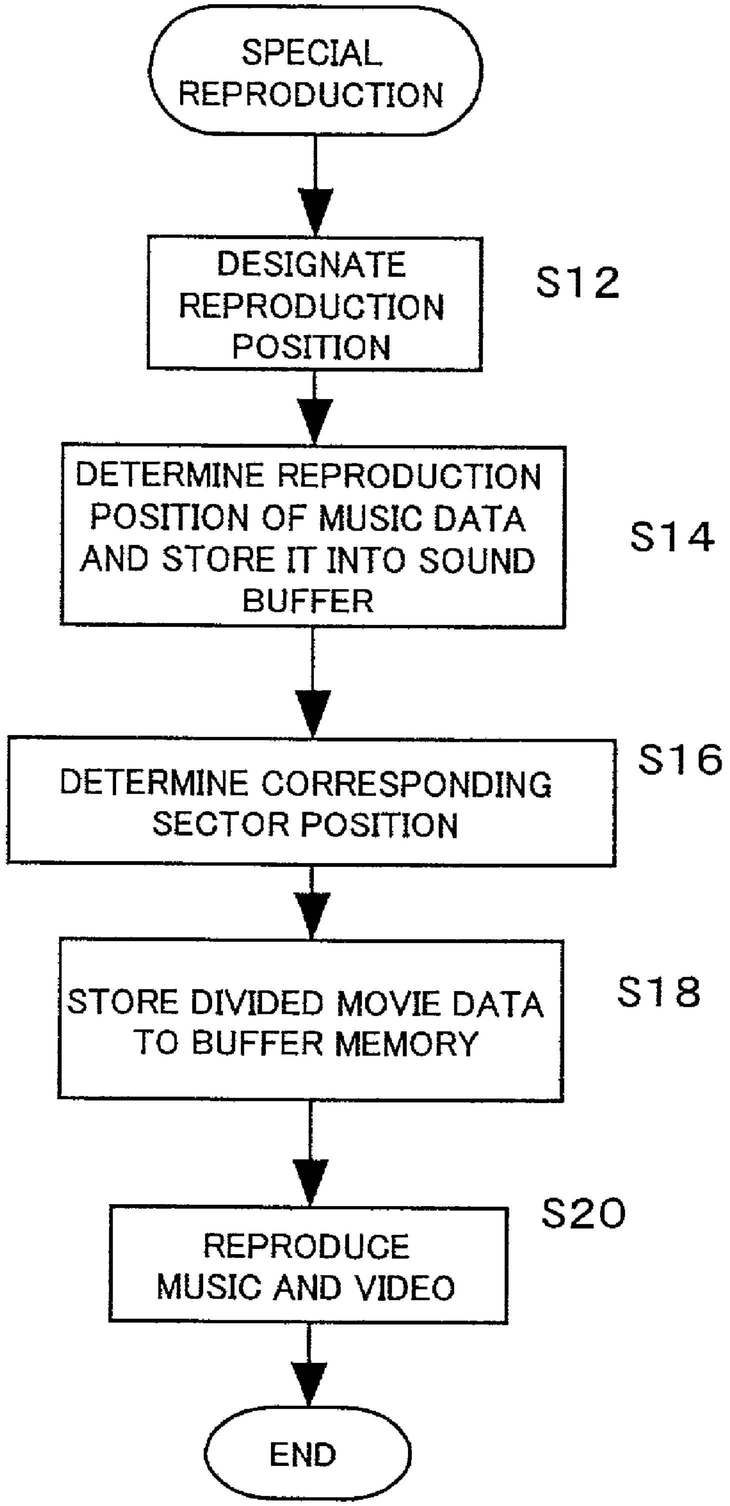
FIG. 4 is a flowchart showing special reproduction processing.

Next, with referring to FIGS. 1 and 4, the description will be given of the special reproduction in which the reproduction position jumps to the head or middle portion of the tune. FIG. 4 is a flowchart showing the special reproduction processing. First, the game player operates the controller 12 to instruct the change of the reproduction position (step S12). This maybe performed by the game player selecting the choices shown on the monitor 9, such as "To the head of the current tune", "To the next tune", "One part (e.g., a predetermined unit such as several measures) back", and "One part ahead". The reproduction position thus instructed is supplied to the CPU 1, and the CPU 1 controls the sound driver 7 and the sound processing unit 6 to determine the corresponding reproduction position of the music data, and then stores the music data into the sound buffer (step S14). Further, the CPU 1 determines the sector of the video data corresponding to the instructed reproduction position by referring to the conversion table already stored into the RAM 3 (step S16), and stores the divided movie data including that sector to the buffer memory from the position of the sector thus determined (step S18). Thus, the reproduction of the music data and the video data becomes ready, and the CPU 1 issues the instruction to the sound processing unit 6 and the GPU 4 to start reproduction (step S18). In this way, the special reproduction such as the change of the reproduction position of the tune is achieved.

While the DVD-ROM 15 is used as the storage medium for the game program and music/video data, the application of the present invention is not limited to this, and other storage medium such as CD-ROM or else may be used.

As described above, according to the present invention, one movie is divided into a plurality of divided movies including an integer number of GOPs, and the video data is recorded on the storage medium such that the head of the divided movie coincides with the head of the sector. Therefore, if the video data is stored into the buffer memory by the unit of the divided movie, the head of the video data stored in the buffer memory necessarily coincides the head of GOP, and the buffer memory necessarily contains an integer number of GOPs. This can eliminate the complicated processing of storing the video data into buffer memory and identifying the unit of GOP in the video data.

Further, since the conversion table showing the correspondence between the position of the divided movie data and the sector position is recorded on the storage medium, when the tune is reproduced from its intermediate position, the recording position of the corresponding video data may be easily obtained by referring to the conversion table. Therefore, the image data may be quickly started.

The invention may be embodied on other specific forms without departing from the spirit or essential characteristics thereof. Thc present embodiments therefore to be considered in all respects as illustrative and not restrictive, the scope of the invention being indicated by the appended claims rather than by the foregoing description and all changes which come within the meaning and range of equivalency of the claims are therefore intended to embraced therein.

The entire disclosure of Japanese Patent Application No. 2000-402539 filed on Dec. 28, 2000 including the specification, claims, drawings and summary is incorporated herein by reference in its entirety.

What is claimed is:

1. An information storage medium for reading by a computer device and having recorded video data including a plurality of unit compressed video data portions correlated with successive periods on a time axis and each of which is reproducible by the computer device independently of each other, the medium comprising:

sectors, each having a sector head, a plurality of video data recording areas, each of the plurality of video data recording areas recording divided video data including a data head, one or more integer number of the unit compressed video data portions correlated with successive periods on the time axis, and a total data amount of the one or more integer number of the unit compressed video data portions being not more than a predetermined data amount, and a table recording area including a recorded table indicating correspondence between time position information of the divided video data and positional information of the sectors on which the unit compressed video data portions are recorded, wherein the divided video data is recorded in each of the plurality of video data recording areas such that the data head of the divided video data coincides with the head of a sector of the sectors on the information storage medium.

2. An information storage medium according to claim 1, wherein the predetermined data amount comprises a storage capacity of a reproduction device which reproduces the video data re corded on the storage medium.

3. The information storage medium of claim 2 wherein the time position information is data indicating positions of respective ones or the unit compressed video data portions from a first one of said successive periods.

4. The information storage medium of claim 2 wherein the time position information is data indicating a timing of respective ones of the unit compressed video data portions from a start of a first one of said successive periods.

5. The information storage medium of claim 1 wherein the time position information is data indicating positions of respective ones of the unit compressed video data portions from a first one of said successive periods.

6. The information storage medium of claim 1 wherein the time position information is data indicating a timing of respective ones of the unit compressed video data portions from a start of a first one of said successive periods.

7. A method or recording video data on an information storage medium, the video data including a plurality of unit compressed video data portions correlated with successive periods on a time axis and each of which is reproducible independently of each other, the method comprising the steps of:

receiving the video data and dividing the received video data into a plurality of the unit compressed video data portions;

combining one or more integer number of the unit compressed video data portions of successive periods on a time axis to produce divided video data such that a total data amount of the unit compressed video data portions is not more than a predetermined data amount;

recording each of the divided video data on the information storage medium such that a head of the divided video data coincides with a head of a sector on the information storage medium;

producing a table recording area including a recorded table indicating correspondence between time position information of the divided video data and positional information of the sectors on which the unit compressed video data portions are recorded; and recording the table on the information storage medium.

8. The method of claim 7 wherein the time position information is data indicating positions of respective ones or the unit compressed video data portions from a first one of said successive periods.

9. The method of claim 7 wherein the time position information is data indicating a timing of respective ones of the unit compressed video data portions from a start of a first one of said successive periods.

10. An information reproducing device for reproducing video data from an information storage medium on which is recorded the video data including:

a plurality of unit compressed video data portions correlated with successive periods on a time axis and each of which is reproducible independently of each other;

a plurality of divided video data each having a data head and a combination of one or more of the unit compressed video data portions such that the data the data head of the divided video data coincides with a head of a sector on the information storage medium; and a table recording area including, a recorded table indicating correspondence between time position information of the divided video data and positional information of the sectors on which the unit compressed video data portions are recorded;

the information reproducing device comprising:

a buffer memory;

a storing unit for reading out the video data from the information storage medium by the unit of the divided video data and storing the video data into the buffer memory; and a video reproducing unit for decoding the unit compressed video data portions included in the divided video data stored in the buffer memory to reproduce the video data;

a receiving unit for receiving a designated reproduction position; and a determining unit for determining a sector position corresponding to a designated time position information based on the recorded table, wherein the storing unit stores the unit compressed video data portions from the corresponding sector position into the buffer memory.

11. An information reproducing device according to claim 10, wherein the information storage medium further includes music data independent of the video data, the divided video data including time information of the divided video data, wherein the information reproducing device further comprises:

a music reproducing unit for obtaining music data corresponding to a designated reproduction position from the information storage medium and for reproducing the music data; and a synchronization control unit for controlling synchronization of the reproduction of the music data by the music reproducing unit and the reproduction of the video data by the video reproducing unit by comparing the reproduction position information currently reproduced by the music reproducing unit with the time position information of the divided video data.

12. An information reproducing device according to claim 11, further comprising:

a unit for receiving a reproduction position change instruction inputted by a game player;

a unit for determining a changed music reproduction position corresponding to the reproduction position after the change based on the change instruction;

a unit for determining a changed video reproduction position corresponding to the changed music reproduction position by referring to thc recorded table; and a unit for controlling the music reproduction unit to reproduce the music data from the changed music reproduction position and controls the video reproduction unit to reproduce the video data from the changed video reproduction position.

13. The device of claim 12 wherein the time position information is data indicating positions of respective ones of the unit compressed video data portions from a first one of said successive periods.

14. The device of claim 12 wherein the time position information is data indicating a timing of respective ones of the unit compressed video data portions from a start of a first one of said successive periods.

15. The device of claim 11 wherein the time position information is data indicating positions of respective ones of the unit compressed video data portions from a first one of said successive periods.

16. The device of claim 11 wherein the time position information is data indicating a timing of respective ones of the unit compressed video data portions from a start of a first one of said successive periods.

17. The device of claim 10 wherein the time position information is date indicating positions of respective ones of the unit compressed video data portions from a first one of said successive periods.

18. The device of claim 10 wherein the time position information is data indicating a timing of respective ones of the unit compressed video data portions from a start of a first one of said successive periods.

* * * * *